US012768283B2

(12) United States Patent
Tomikawa et al.

(10) Patent No.: US 12,768,283 B2
(45) Date of Patent: Oct. 20, 2026

(54) DOUBLE SCROLL TURBINE AND TURBOCHARGER

(71) Applicant: MITSUBISHI HEAVY INDUSTRIES ENGINE & TURBOCHARGER, LTD., Sagamihara (JP)

(72) Inventors: Kunihiro Tomikawa, Tokyo (JP); Toru Hoshi, Tokyo (JP); Takao Yokoyama, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 19/159,866

(22) PCT Filed: Mar. 31, 2023

(86) PCT No.: PCT/JP2023/013507
§ 371 (c)(1),
(2) Date: Aug. 26, 2025

(87) PCT Pub. No.: WO2024/201989
PCT Pub. Date: Oct. 3, 2024

(65) Prior Publication Data
US 2026/0243171 A1 Aug. 20, 2026

(51) Int. Cl.
*F01D 17/10* (2006.01)
*F01D 17/14* (2006.01)
(Continued)

(52) U.S. Cl.
CPC ......... *F01D 17/105* (2013.01); *F01D 17/148* (2013.01); *F02B 37/025* (2013.01);
(Continued)

(58) Field of Classification Search
CPC ...... F02B 37/025; F02B 37/183; F02B 37/18; F01D 17/105; F01D 9/026
See application file for complete search history.

(56) References Cited

U.S. PATENT DOCUMENTS 10,871,102 B2 * 12/2020 Sparrer ................ F02B 37/183
10,941,699 B2 * 3/2021 Karstadt ................ F02B 37/24
(Continued)

FOREIGN PATENT DOCUMENTS

DE 10 2015 011 146 A1 3/2016
DE 20 2014 009 873 U1 3/2016
(Continued)

OTHER PUBLICATIONS

International Search Report (PCT/ISA/210), issued in PCT/JP2023/013507, dated May 23, 2023.
(Continued)

*Primary Examiner* — Courtney D Heinle
*Assistant Examiner* — Behnoush Haghighian
(74) *Attorney, Agent, or Firm* — Birch, Stewart, Kolasch & Birch, LLP

(57) ABSTRACT

This double scroll turbine comprises a valve device. The valve device includes: a valve rod that extends so as to cross a connection flow path and is provided so that the axis passes through an outlet; a first opening/closing plate that is attached to the valve rod so as to extend along the axis and is for opening/closing the connection flow path with the rotation of the valve rod; and a second opening/closing plate that extends in a direction intersecting the axis and, as compared to the first opening/closing plate, is attached to the valve rod on a side closer to the outlet, and is for opening/closing a bypass flow path with the rotation of the valve rod.

8 Claims, 9 Drawing Sheets

(51) Int. Cl.

| | |
|---|---|
| ***F02B 37/02*** | (2006.01) |
| ***F02B 37/18*** | (2006.01) |
| ***F02C 6/12*** | (2006.01) |

(52) U.S. Cl.

CPC .............. *F02B 37/183* (2013.01); *F02C 6/12* (2013.01); *F05D 2220/40* (2013.01); *F05D 2260/606* (2013.01)

(56) References Cited

U.S. PATENT DOCUMENTS

| | | | | |
|---|---|---|---|---|
| 11,028,765 | B2 * | 6/2021 | Cola | F16K 11/161 |
| 11,047,294 | B2 * | 6/2021 | Cola | F02B 37/183 |
| 11,408,333 | B2 * | 8/2022 | Cola | F01D 17/143 |
| 2012/0060494 | A1 * | 3/2012 | Sato | F02B 37/183 60/602 |
| 2016/0341109 | A1 | 11/2016 | Lummer et al. | |
| 2016/0341111 | A1 | 11/2016 | Lummer et al. | |
| 2017/0350312 | A1 * | 12/2017 | Karstadt | F02B 37/183 |
| 2019/0048791 | A1 | 2/2019 | Rankenberg et al. | |
| 2019/0178150 | A1 | 6/2019 | Mehne et al. | |
| 2020/0263598 | A1 * | 8/2020 | Cola | F01D 17/08 |
| 2020/0318530 | A1 * | 10/2020 | Sparrer | F02B 37/183 |
| 2020/0318531 | A1 | 10/2020 | Sparrer | |

FOREIGN PATENT DOCUMENTS

| | | | |
|---|---|---|---|
| DE | 10 2015 209 044 | A1 | 11/2016 |
| DE | 10 2016 204 076 | A1 | 11/2016 |
| DE | 10 2015 011 544 | A1 | 3/2017 |
| DE | 10 2015 011 562 | A1 | 3/2017 |
| DE | 10 2016 208 162 | A1 | 11/2017 |
| DE | 10 2016 208 163 | A1 | 11/2017 |
| DE | 10 2013 002 894 | B4 | 12/2018 |
| DE | 10 2018 005 460 | B3 | 8/2019 |
| DE | 10 2016 208 160 | B4 | 4/2020 |
| EP | 3 696 387 | B1 | 9/2021 |
| WO | WO 2017/150543 | A1 | 9/2017 |

OTHER PUBLICATIONS

Written Opinion of the International Searching Authority (PCT/ISA/237), issued in PCT/JP2023/013507, dated May 23, 2023.

* cited by examiner

DOUBLE SCROLL TURBINE AND TURBOCHARGER

TECHNICAL FIELD

The present disclosure relates to a double scroll turbine in which two scroll flow paths are formed, and a turbocharger.

BACKGROUND ART

In the related art, a double scroll turbine in which a communication flow path for allowing two scroll flow paths to communicate with each other and a bypass flow path connected to the communication flow path and an exhaust gas flow path are formed is known. For example, the double scroll turbine disclosed in PTL 1 includes a flap valve for opening/closing a communication flow path and a bypass flow path.

CITATION LIST

Patent Literature

[PTL 1] German Patent No. DE102013002894

SUMMARY OF INVENTION

Technical Problem

In the double scroll turbine of PTL 1, the communication flow path and the bypass flow path are opened/closed by a single valve body. Therefore, there is a risk that it may be difficult to freely open/close the two flow paths. As a specific example, when the valve body opens the communication flow path, there is a risk that the bypass flow path may also be inevitably opened. Therefore, in a case where the valve is opened to allow the exhaust gas to flow through the communication flow path, the exhaust gas also flows through the bypass flow path, and the turbine efficiency decreases. As another example, even when the valve body is disposed at a position where the communication flow path and the bypass flow path are closed, there is a risk that the communication flow path may be slightly opened.

An object of the present disclosure is to provide a double scroll turbine and a turbocharger in which a communication flow path and a bypass flow path can be freely opened/closed.

Solution to Problem

A double scroll turbine according to at least one embodiment of the present disclosure is a double scroll turbine including: a turbine housing formed with two double scroll-type scroll flow paths configured to guide exhaust gas to a turbine wheel and a discharge flow path for discharging the exhaust gas that has passed through the turbine wheel, in which the turbine housing includes a communication flow path wall that defines a communication flow path that allows the two scroll flow paths to communicate with each other, and a bypass flow path wall that defines a bypass flow path for guiding the exhaust gas flowing through the communication flow path to the discharge flow path while bypassing the turbine wheel, the communication flow path wall is formed with an outlet that guides the exhaust gas flowing through the communication flow path to the bypass flow path, the double scroll turbine further includes a valve device, and the valve device includes a valve rod that extends to cross the communication flow path and that has an axis provided to pass through the outlet, a first opening/closing plate that is attached to the valve rod to extend along the axis and that is for opening/closing the communication flow path with rotation of the valve rod, and a second opening/closing plate that extends in a direction intersecting the axis, is attached to the valve rod on a side closer to the outlet than the first opening/closing plate, and is for opening/closing the bypass flow path with the rotation of the valve rod.

A turbocharger according to at least one embodiment of the present disclosure includes: a rotating shaft; the double scroll turbine including the turbine wheel connected to one end portion of the rotating shaft; and a compressor including a compressor wheel connected to the other end portion of the rotating shaft.

Advantageous Effects of Invention

According to the present disclosure, it is possible to provide the double scroll turbine and the turbocharger in which the communication flow path and the bypass flow path can be freely opened/closed.

DESCRIPTION OF EMBODIMENTS

Figure 1:
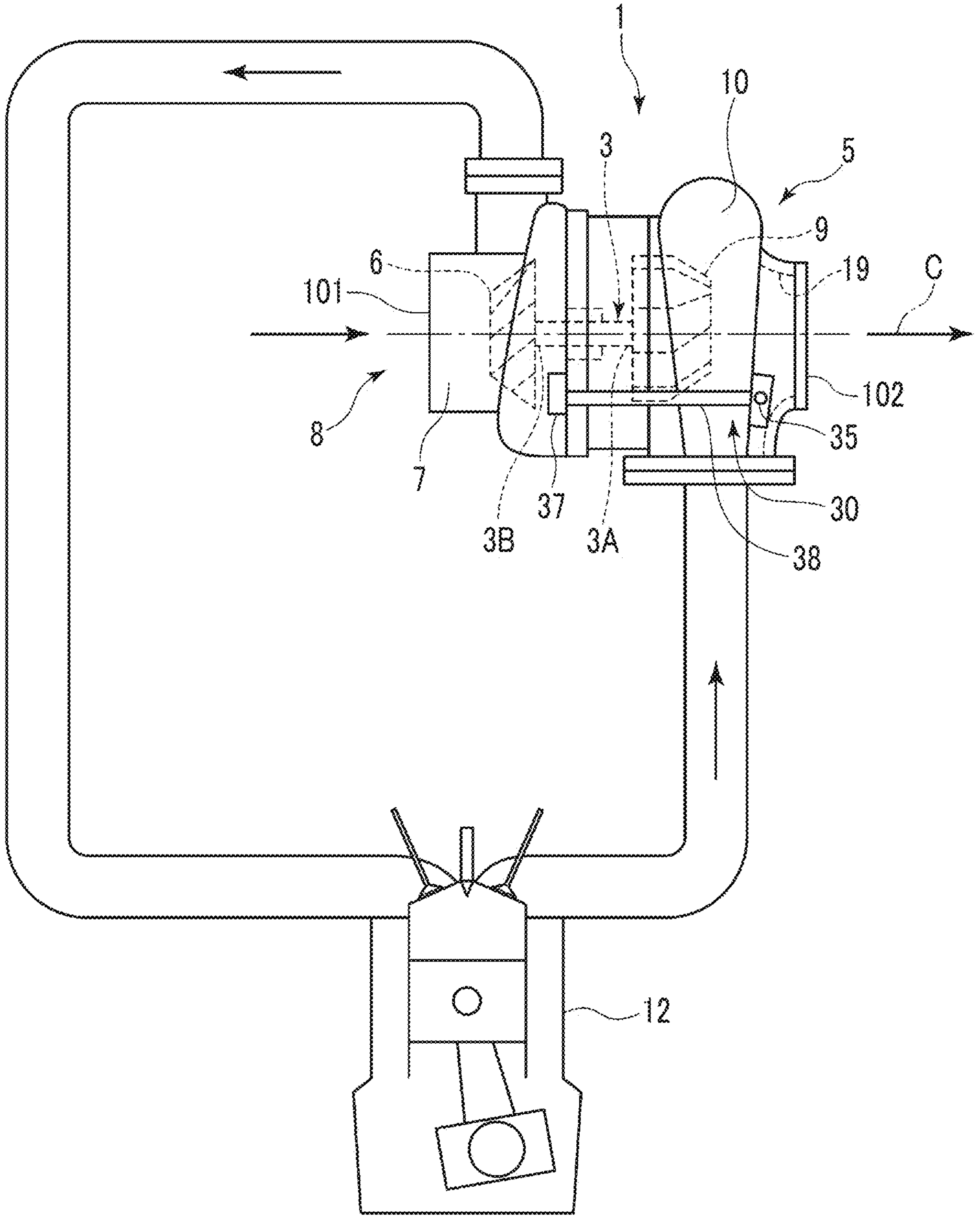
FIG. 1 is a schematic diagram of a turbocharger according to an embodiment.

Hereinafter, several embodiments of the present disclosure will be described with reference to the accompanying drawings. Dimensions, materials, shapes, relative arrangements, and the like of components described as embodiments or shown in the drawings are not intended to limit the scope of the present disclosure, but are merely explanatory examples.

For example, an expression representing a relative or absolute arrangement such as “in a certain direction”, “along a certain direction”, “parallel”, “orthogonal”, “center”, “concentric”, or “coaxial” does not strictly represent only such an arrangement, but also a tolerance or a state of being relatively displaced with an angle or a distance to the extent that the same function can be obtained.

For example, expressions such as “identical”, “equal”, and “homogeneous” indicating that things are in an equal state do not strictly represent only the equal state, but also a tolerance or a state where there is a difference to the extent that the same function can be obtained.

For example, an expression representing a shape such as a quadrangular shape or a cylindrical shape does not represent only a shape such as a quadrangular shape or a cylindrical shape in a geometrically strict sense, but also a shape including an uneven portion, a chamfered portion, and the like within a range in which the same effect can be obtained.

Meanwhile, expressions such as “being provided with”, “including”, or “having” one component are not exclusive expressions excluding existence of other components. The same configurations are denoted by the same reference numerals, and the description thereof may be omitted.

<Overall Configuration of Turbocharger 1>

FIG. 1 is a schematic diagram showing a turbocharger 1 according to an embodiment of the present disclosure. The turbocharger 1 of the present example is mounted in, for example, an engine 12 that may be applied to an automobile. The turbocharger 1 includes a rotating shaft 3, a double scroll turbine 5 including a turbine wheel 9 connected to one end portion 3A of the rotating shaft 3, and a compressor 8 including a compressor wheel 6 connected to the other end portion 3B of the rotating shaft 3.

In the following description, the double scroll turbine 5 may be simply referred to as a “turbine 5”. Further, a direction in which a central axis C of the rotating shaft 3 extends is referred to as a “turbine axial direction”, and a radial direction and a circumferential direction with reference to the central axis C may be referred to as a “turbine radial direction” and a “turbine circumferential direction”, respectively. An outer side in the turbine radial direction is a side in a direction away from the central axis C, and an inner side in the turbine radial direction is a side in a direction closer to the central axis C.

The compressor 8 further includes a compressor housing 7 that accommodates the compressor wheel 6. Air taken in from a suction port 101 formed in the compressor housing 7 is compressed by the compressor wheel 6 and is sent to the engine 12. The turbine 5 further includes a double scroll-type turbine housing 10 that accommodates the turbine wheel 9. The turbine wheel 9 rotates together with the rotating shaft 3 by using exhaust gas discharged from the engine 12 as a working medium. The exhaust gas that has passed through the turbine wheel 9 is discharged from an exhaust port 102 formed in the turbine housing 10.

<Turbine Housing 10>

Figure 2:
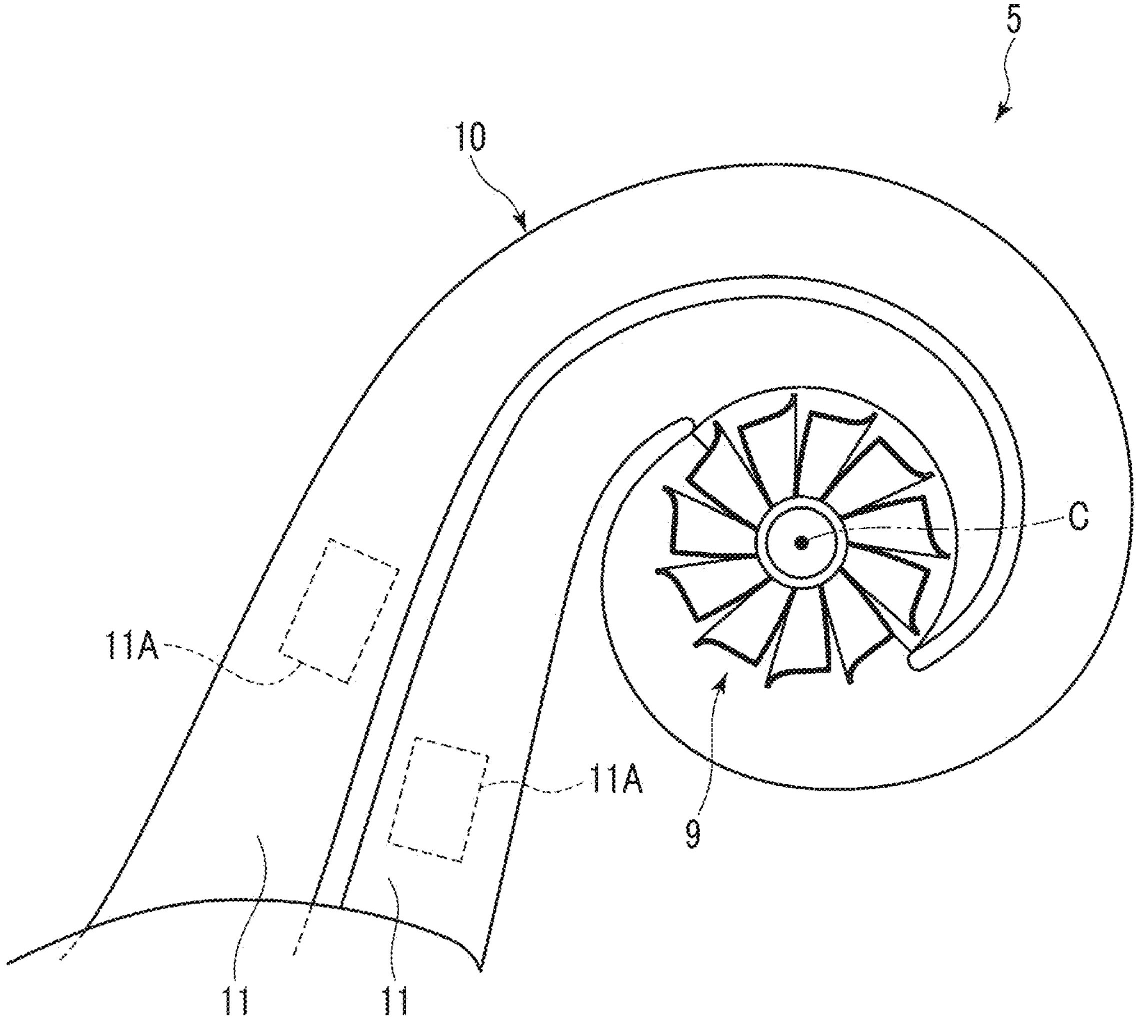
FIG. 2 is a schematic diagram of a turbine according to the embodiment.

FIG. 2 is a schematic diagram of the turbine 5 according to the embodiment of the present disclosure. Two scroll flow paths 11 for guiding exhaust gas to the turbine wheel 9 are formed in the turbine housing 10. The two scroll flow paths 11 are disposed in the same range as each other in the turbine axial direction and are configured to supply the exhaust gas to the turbine wheel 9 in different ranges in the turbine circumferential direction. In addition, the turbine housing 10 is formed with a discharge flow path 19 (refer to FIG. 1) for discharging the exhaust gas, which has passed through the turbine wheel 9, to the outside of the system. The discharge flow path 19 of the present example extends in the turbine axial direction, and the exhaust gas that has passed through the turbine wheel 9 is discharged from the exhaust port 102 via the discharge flow path 19.

Figure 3:
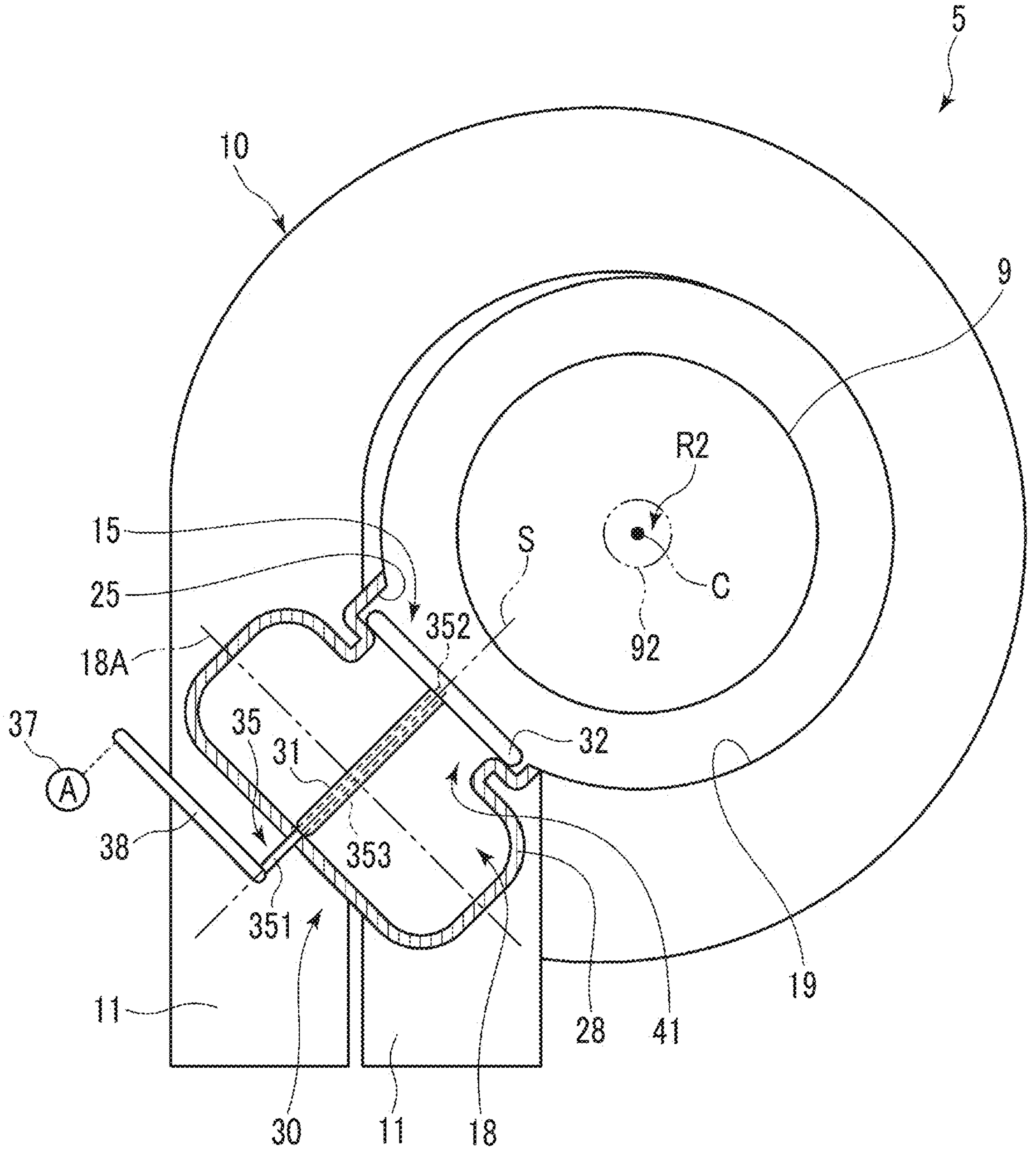
FIG. 3 is a schematic diagram of a turbine housing according to the embodiment.

FIG. 3 is a schematic diagram of the turbine housing 10 according to the embodiment of the present disclosure, with the turbine wheel 9 schematically shown. The turbine housing 10 includes a communication flow path wall 28 that defines a communication flow path 18 that allows the two scroll flow paths 11 to communicate with each other, and a bypass flow path wall 25 that defines a bypass flow path 15 for guiding the exhaust gas flowing through the communication flow path 18 to the discharge flow path 19 while bypassing the turbine wheel 9.

Both end portions of the communication flow path wall 28 are respectively connected to communication ports 11A (refer to FIG. 2) formed in the two scroll flow paths 11. In addition, an outlet 41 for guiding the exhaust gas flowing through the communication flow path 18 to the bypass flow path 15 is formed in the communication flow path wall 28. The outlet 41 is located between the two communication ports 11A and is located closer to the discharge flow path 19 than the turbine wheel 9. The outlet 41 of the present example penetrates the communication flow path wall 28 in the turbine radial direction.

<Valve Device 30>

As shown in FIG. 3, the turbine 5 further includes a valve device 30 configured to open/close each of the communication flow path 18 and the bypass flow path 15. The valve device 30 includes a valve rod 35 that extends to cross the communication flow path 18, a first opening/closing plate 31 that is attached to the valve rod 35, and a second opening/closing plate 32 that is attached to the valve rod 35 on a side closer to the outlet 41 than the first opening/closing plate 31. Both the first opening/closing plate 31 and the second opening/closing plate 32 are configured to rotate integrally with the valve rod 35.

The valve rod 35 of the present example includes a first end portion 351 that is located on a side opposite to the outlet 41 with respect to the communication flow path 18, a second end portion 352 that is located on the outlet 41 side with respect to the communication flow path 18, and an extending portion 353 that extends between the first end portion 351 and the second end portion 352. Both the first end portion 351 and the second end portion 352 are disposed outside the communication flow path wall 28. An axis S of the valve rod 35 configured in this way is substantially orthogonal to a communication flow path center line 18A, which is a flow path center line of the communication flow path 18, and passes through the communication flow path 18 and the outlet 41.

The first opening/closing plate 31 attached to the extending portion 353 of the valve rod 35 extends along the axis S. The first opening/closing plate 31 is configured to open/close the communication flow path 18 with the rotation of the valve rod 35. More specifically, the first opening/closing plate 31 is configured to rotate between a first closed position (refer to FIG. 7A) where the first opening/closing plate 31 closes the communication flow path 18 in a posture extending to be orthogonal to the communication flow path center line 18A and a first open position (refer to FIG. 7D) where the first opening/closing plate 31 opens the communication flow path 18 in a posture extending parallel to the communication flow path center line 18A. The first opening/closing plate 31 fully closes the communication flow path 18 at the first closed position and fully opens the communication flow path 18 at the first open position.

As shown in FIG. 3, the second opening/closing plate 32 attached to the second end portion 352 of the valve rod 35 extends to intersect the axis S and is formed separately from the first opening/closing plate 31. The second opening/closing plate 32 is configured to open/close the bypass flow path 15 with the rotation of the valve rod 35. More specifically, the second opening/closing plate 32 is configured to switch between a closed state (refer to FIGS. 8A and 8B) in which the bypass flow path 15 is closed and an open state (refer to FIGS. 8C and 8D) in which the bypass flow path 15 is opened. Details of a configuration in which the second opening/closing plate 32 opens/closes the bypass flow path 15 will be described below. The second opening/closing plate 32 of the present example extends to be substantially orthogonal to the axis S.

Since the first opening/closing plate 31 and the second opening/closing plate 32 for opening/closing the communication flow path 18 and the bypass flow path 15 are configured to be separate from each other, the turbine 5 capable of freely opening/closing the communication flow path 18 and the bypass flow path 15 is realized. In the present embodiment, whether or not to open/close the bypass flow path 15 at the timing when the communication flow path 18 is opened can be freely adjusted at the design stage of the turbine 5. Furthermore, it is also possible to shift the opening timing of the bypass flow path 15 from the opening timing of the communication flow path 18, and it is also possible to suppress unintended leakage of the exhaust gas in the bypass flow path 15 or the communication flow path 18.

In the following description, the axial direction of the axis S of the valve rod 35 may be simply referred to as an "axial direction". In addition, the radial direction and the circumferential direction with reference to the axis S may be simply referred to as a "radial direction" and a "circumferential direction", respectively.

<Opening/Closing Structure of Bypass Flow Path 15>

Figure 4:
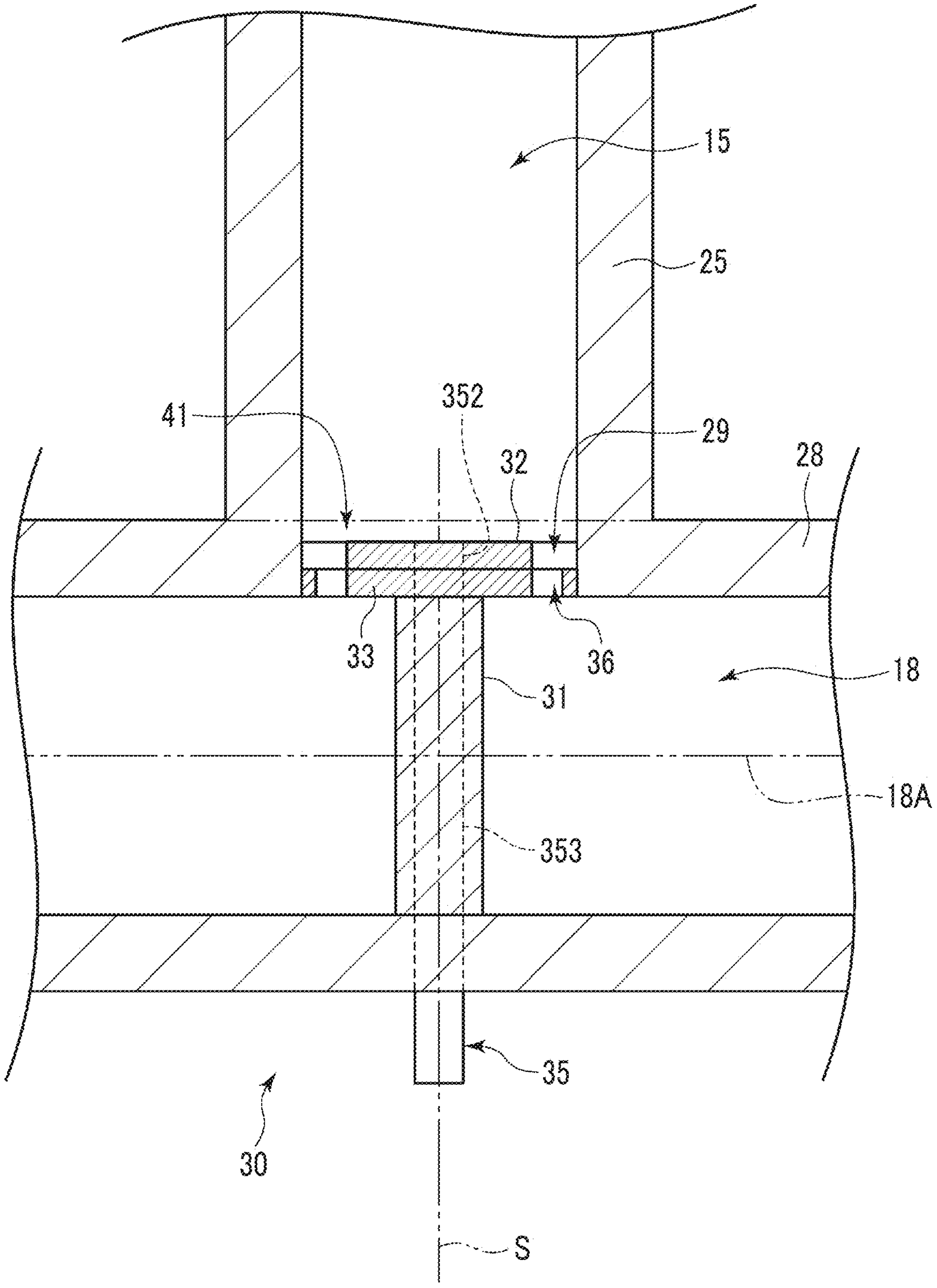
FIG. 4 is a schematic diagram of a valve device according to the embodiment.
Figure 5:
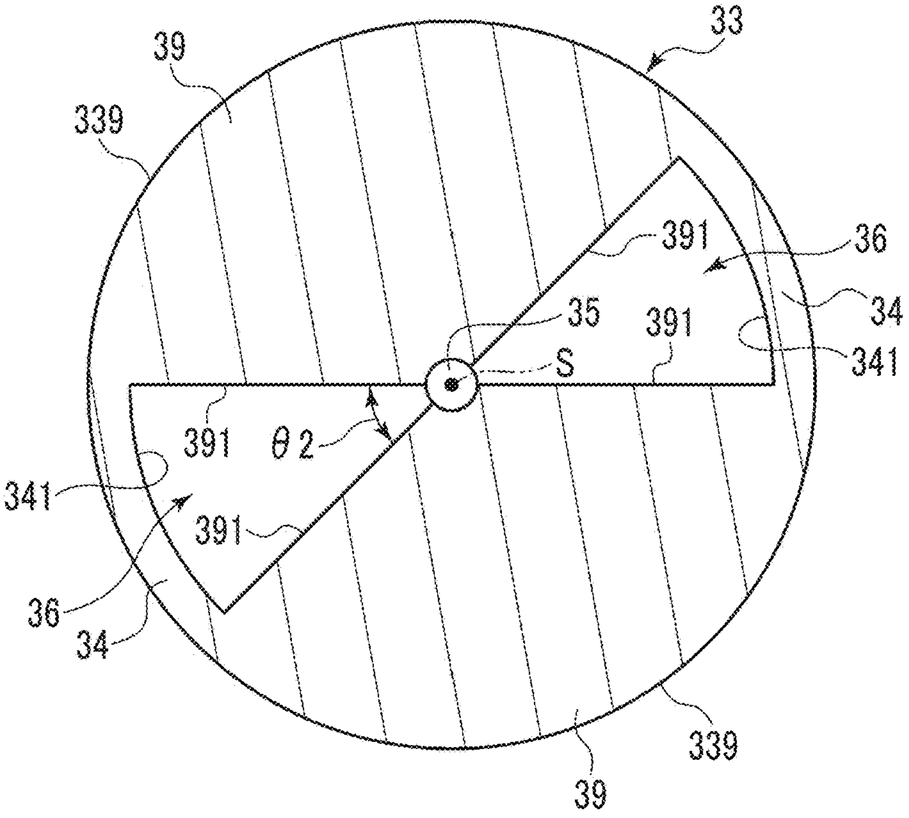
FIG. 5 is a schematic diagram of a facing plate according to the embodiment.
Figure 6:
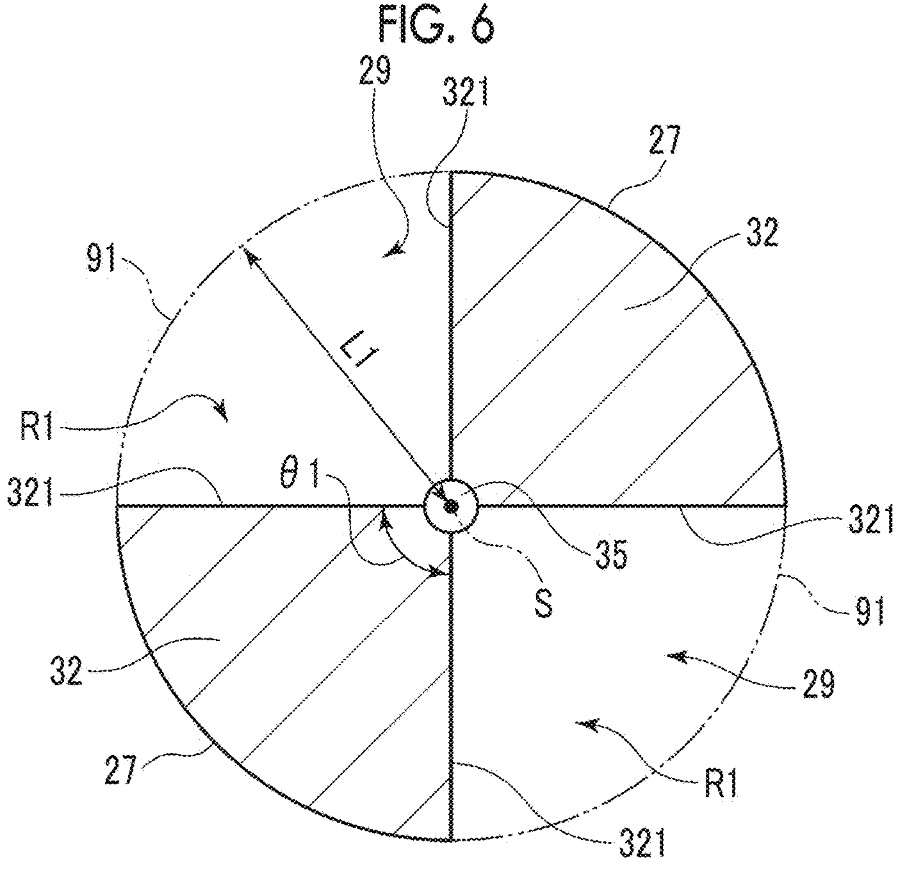
FIG. 6 is a schematic diagram of a second opening/closing plate according to the Embodiment.

FIG. 4 is a schematic diagram of the valve device 30 according to the embodiment of the present disclosure, FIG. 5 is a schematic diagram of the facing plate 33 according to the embodiment of the present disclosure, and FIG. 6 is a schematic diagram of the second opening/closing plate 32 according to the embodiment of the present disclosure.

As shown in FIGS. 4 and 5, the turbine 5 further includes the facing plate 33 that faces the second opening/closing plate 32 from an upstream side in a flow direction of the bypass flow path 15. The facing plate 33 formed in a circular shape is configured separately from the turbine housing 10, and is fixed to an inner surface of the turbine housing 10 by, for example, welding. As a more specific example, an outer peripheral surface 339 of the facing plate 33 is fixed to an inner surface of the communication flow path wall 28 defining the outlet 41.

In addition, the facing plate 33 defines a passage port 36 through which the exhaust gas passes. The passage port 36 is a hole that is open in the axial direction. In the example of FIG. 5, a pair of passage ports 36 is formed in the facing plate 33 as openings. More specifically, the facing plate 33 includes a pair of main body portions 39 and a pair of connection portions 34. Each of the pair of main body portions 39 formed to be symmetrical with respect to the axis S has a fan shape with the axis S as a reference. The connection portions 34 extend in the circumferential direction and are connected to outer end portions of the pair of main body portions 39 in the radial direction. In such a configuration, the passage port 36 is defined by an end surface 391 of the main body portion 39 in the circumferential direction and an inner peripheral surface 341 of the connection portion 34. In the present example, the pair of passage ports 36 is disposed at equal intervals in the circumferential direction. Each passage port 36 has a fan shape centered on the axis S. The valve rod 35 is inserted through a center hole formed in a central portion of the facing plate 33.

In another example, a single passage port 36 as a through-hole may be formed in the facing plate 33 (not shown).

As shown in FIG. 6, the second opening/closing plate 32 has an outer peripheral surface 27 facing the outer side in the radial direction. The outer peripheral surface 27 of the present example extends parallel to the circumferential direction, and the second opening/closing plate 32 has a fan shape centered on the axis S. The diameter of the outer peripheral surface 27 is larger than the diameter of the inner peripheral surface 341 of the facing plate 33. In the drawing, a maximum distance from the axis S of the valve rod 35 to the outer peripheral surface 27 is represented by a dimension L1. The second opening/closing plate 32 defines the opening 29. The opening 29 is located in an inner region R1 of a first virtual circle 91 centered on the axis S and having a dimension L1 as a radius. In the example of FIG. 6, the opening 29 is defined by the end surface 321 of the second opening/closing plate 32 in the circumferential direction, in other words, a plurality of the second opening/closing plates 32 are disposed in the circumferential direction with the openings 29 opened. In the present example, the pair of second opening/closing plates 32 is disposed, and the pair of openings 29 is disposed at equal intervals in the circumferential direction. Further, in the examples of FIGS. 5 and 6, a central angle (01) of the second opening/closing plate 32 having a fan shape is larger than a central angle (02) of the passage port 36 having a fan shape.

In another example, an opening 29 as a through-hole may be formed in a single second opening/closing plate 32 (not shown). In this case, the opening 29 is defined by an opening formed in the second opening/closing plate 32. In addition, the number of openings 29 may not be the same as the number of passage ports 36, and the number of openings 29 and the number of passage ports 36 may be different from each other.

The second opening/closing plate 32 of the present example is configured to open/close the bypass flow path 15 by opening/closing the passage port 36. The second opening/closing plate 32 is configured to rotate between a second closed position (refer to FIG. 8A), which is one end of a movable range, and a second open position (refer to FIG. 8D), which is the other end of the movable range. In a case where the second opening/closing plate 32 is at the second closed position, the passage port 36 is closed by the second opening/closing plate 32, and the opening 29 is at a position shifted from the passage port 36 in the circumferential direction. For a while after the second opening/closing plate 32 starts to rotate from the second closed position toward the second open position, the passage port 36 maintains a state in which the passage port 36 is closed by the second opening/closing plate 32 (refer to FIG. 8B). Eventually, the opening 29 faces a part of the passage port 36 in the axial direction (refer to FIG. 8C), and when the second opening/closing plate 32 reaches the second open position, the passage port 36 is fully opened (refer to FIG. 8D).

According to the above-described configuration, the position of the opening 29 defined by the second opening/closing plate 32 changes with the rotation of the valve rod 35, so that the second opening/closing plate 32 can open/close the bypass flow path 15. Whether or not the timing when the communication flow path 18 is opened/closed and the timing when the bypass flow path 15 is opened/closed are made to coincide with each other or differ from each other can be freely adjusted according to the shape of the second opening/closing plate 32, which is determined at the design stage of the turbine 5. Accordingly, the communication flow path 18 and the bypass flow path 15 can be further freely opened/closed.

In addition, according to the configuration in which the facing plate 33 separate from the turbine housing 10 is provided, it is possible to avoid complicating the shape of the turbine housing 10. In addition, since the bypass flow path 15 can be opened/closed simply depending on whether the opening 29 defined by the second opening/closing plate 32 faces the passage port 36, the configuration of the valve device 30 can be simplified.

In addition, according to the configuration in which the plurality of passage ports 36 are disposed, the locations through which the exhaust gas passes can be distributed in the facing plate 33, and an excessive temperature rise in a specific part of the facing plate 33 can be suppressed. Such a technical advantage can also be obtained in the embodiment in which the plurality of passage ports 36 are disposed at unequal intervals in the circumferential direction.

In addition, according to the configuration in which the plurality of openings 29 are disposed at intervals in the circumferential direction by the same number as the plurality of passage ports 36, the amount of rotation of the second opening/closing plate 32 required for opening/closing the bypass flow path 15 can be reduced as compared to a case where the number of openings 29 is smaller than the number of passage ports 36. Accordingly, the bypass flow path 15 can be quickly opened/closed.

<Opening/Closing Timing of Communication Flow Path 18 and Bypass Flow Path 15>

Figure 7A:
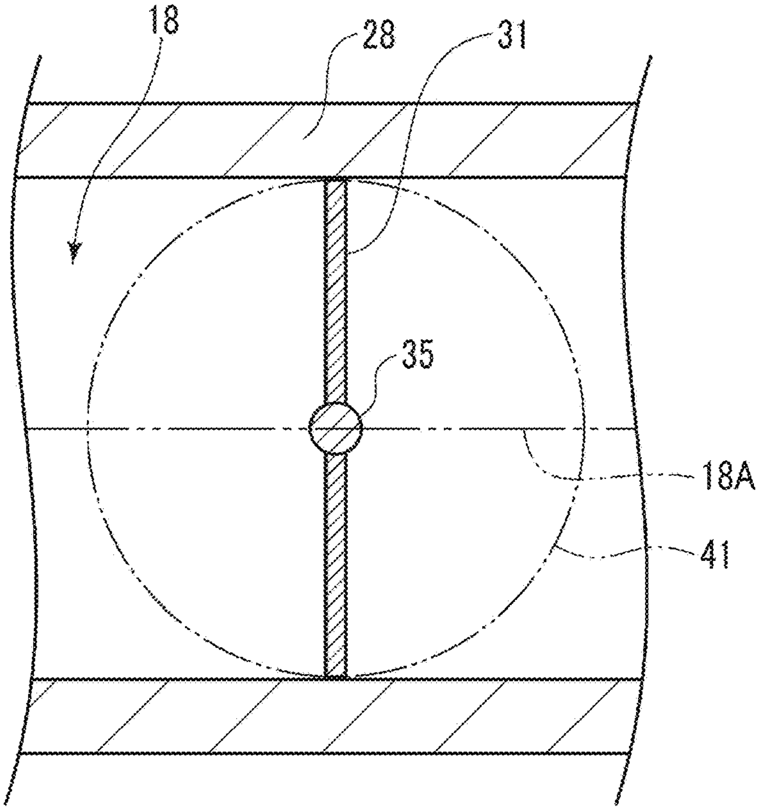
FIG. 7A is a schematic diagram showing a process of opening a communication flow path according to the embodiment.
Figure 7B:
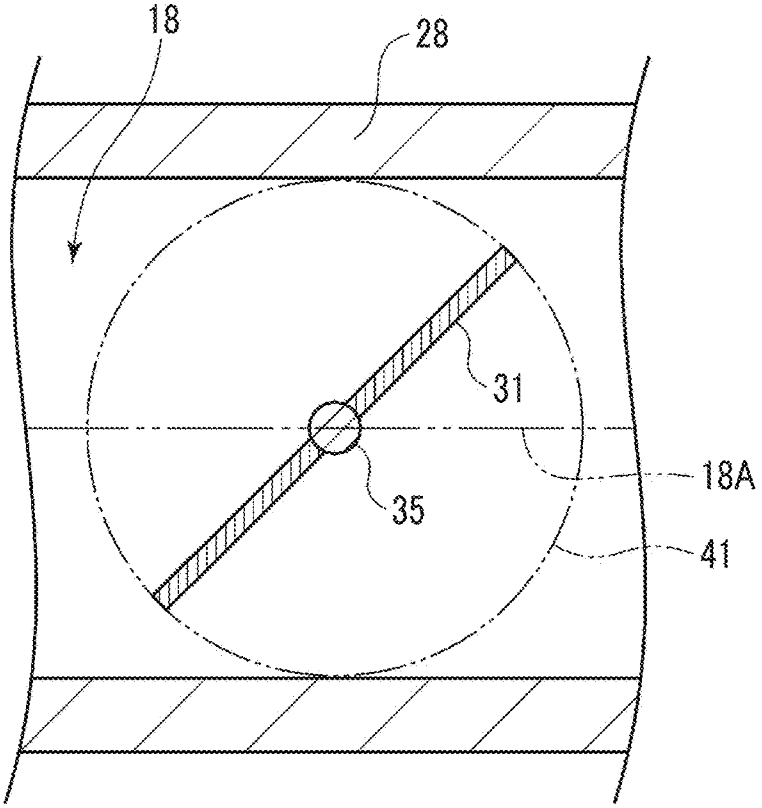
FIG. 7B is a schematic diagram showing the process of opening the communication flow path, which follows FIG. 7A.

The opening/closing timings of the communication flow path 18 and the bypass flow path 15 will be described with reference to FIGS. 7A to 7D and FIGS. 8A to 8D. FIGS. 7A to 7D are schematic diagrams showing a process of opening the communication flow path 18 according to the embodiment of the present disclosure, and FIGS. 8A to 8D are schematic diagrams showing a process of opening the passage port 36 according to the embodiment of the present disclosure. FIGS. 7A and 8A show the state of the valve device 30 at the same time point, and FIGS. 7B and 8B show the state of the valve device 30 at the same time point. A similar relationship is also established between FIG. 7C and FIG. 8C and between FIG. 7D and FIG. 8D. In FIGS. 8A to 8D, for the sake of making the drawings easier to see, the second opening/closing plate 32 is shown so as to have a radius larger than the radius of the facing plate 33. However, the second opening/closing plate 32 and the facing plate 33 may have the same radius.

As shown in FIGS. 7A and 7B, the first opening/closing plate 31 starts to rotate from the first open position to open the communication flow path 18 with the rotation of the valve rod 35. In this case, as shown in FIGS. 8A and 8B, the second opening/closing plate 32 also rotates from the second open position toward the second closed position. However, since the central angle of the second opening/closing plate 32 is larger than the central angle of the passage port 36, the opening 29 is still in a state shifted from the passage port 36 in the circumferential direction. That is, the second opening/closing plate 32 maintains a closed state.

Figure 7C:
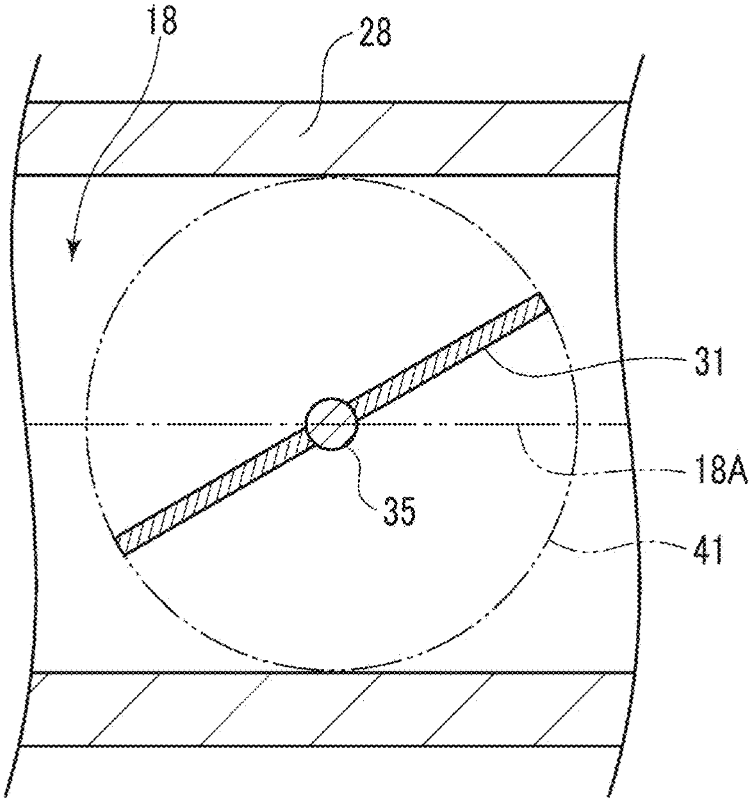
FIG. 7C is a schematic diagram showing the process of opening the communication flow path, which follows FIG. 7B.
Figure 8A:
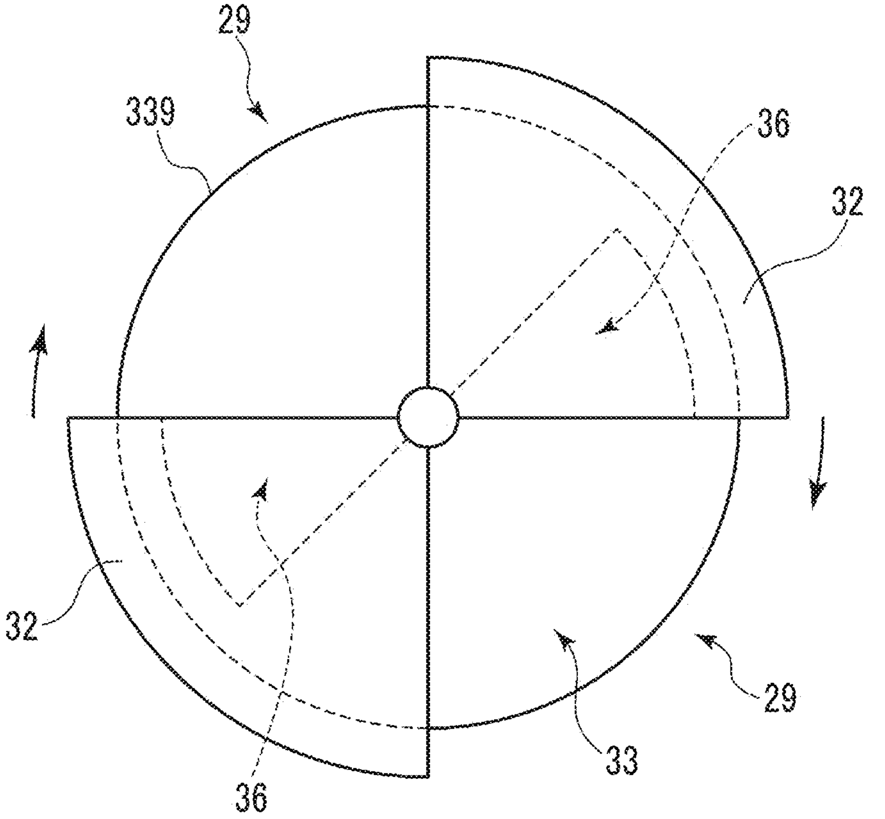
FIG. 8A is a schematic diagram showing a process of opening a passage port according to the embodiment.
Figure 8B:
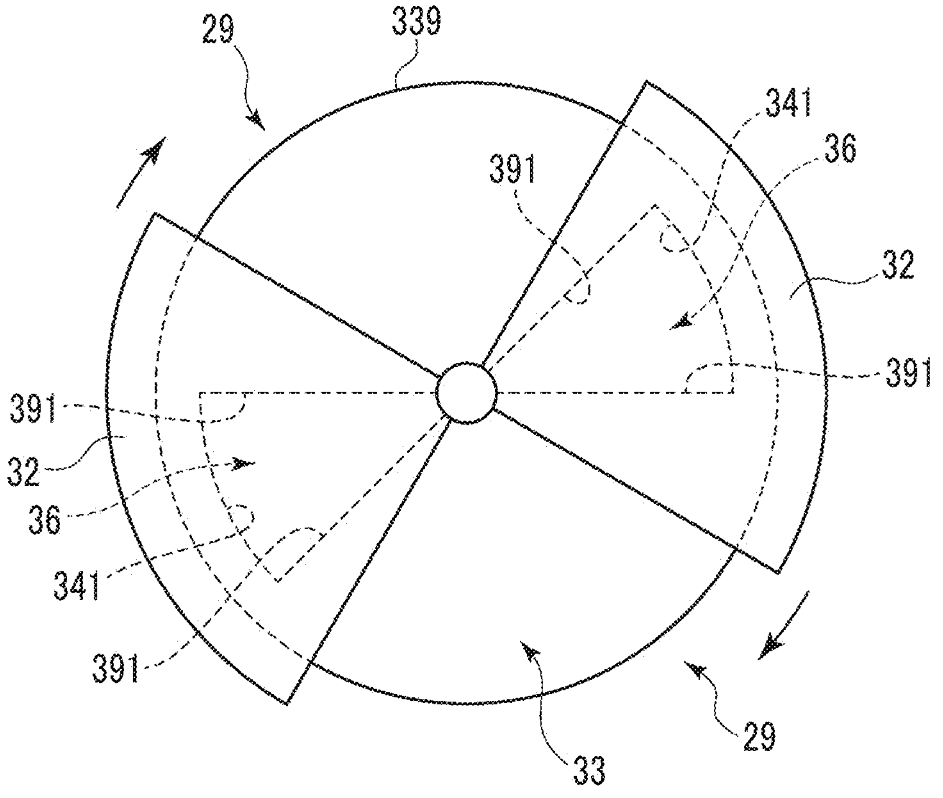
FIG. 8B is a schematic diagram showing the process of opening the passage port, which follows FIG. 8A.
Figure 8C:
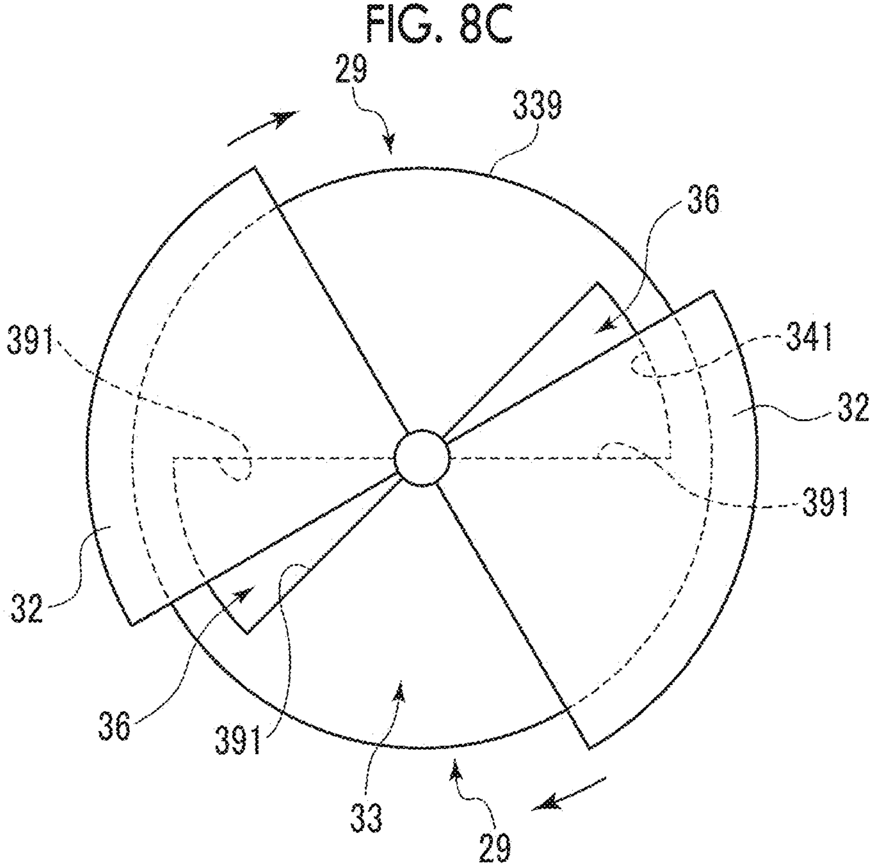
FIG. 8C is a schematic diagram showing the process of opening the passage port, which follows FIG. 8B.

As shown in FIGS. 7B and 7C, the first opening/closing plate 31 further rotates to further open the communication flow path 18. That is, the opening degree of the communication flow path 18 gradually increases. In this case, as shown in FIGS. 8B and 8C, the opening 29 faces a part of the passage port 36 in the axial direction, and the second opening/closing plate 32 is switched from the closed state to the open state.

Figure 7D:
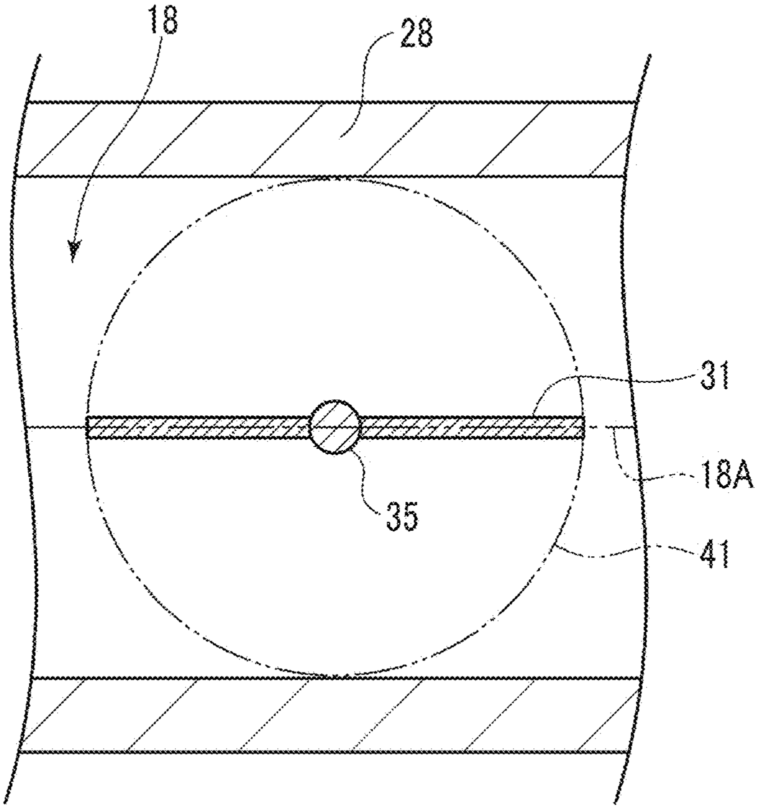
FIG. 7D is a schematic diagram showing the process of opening the communication flow path, which follows FIG. 7C.
Figure 8D:
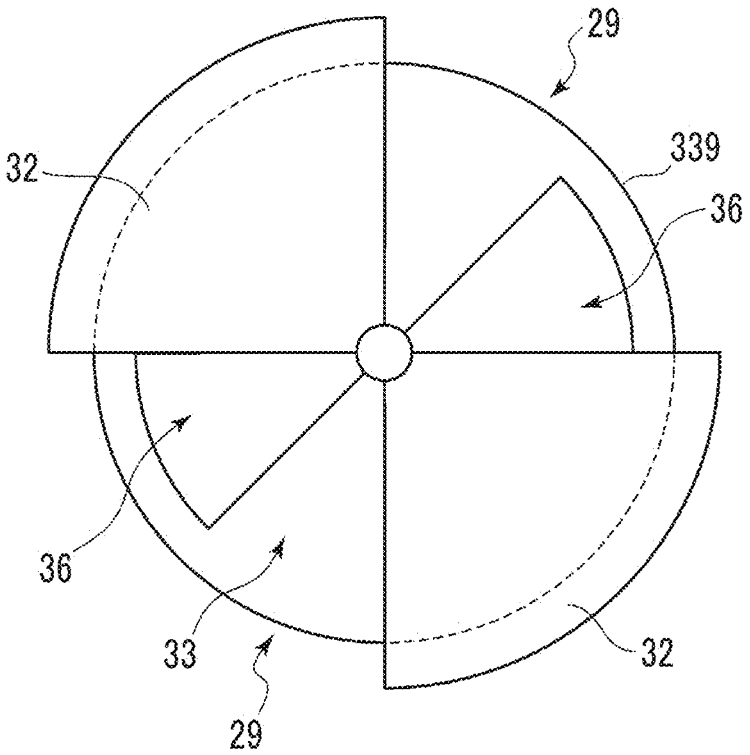
FIG. 8D is a schematic diagram showing the process of opening the passage port, which follows FIG. 8C.

As shown in FIGS. 7C and 7D, when the first opening/closing plate 31 further rotates to reach the first open position, the communication flow path 18 is fully opened. In this case, as shown in FIGS. 8C and 8D, the opening degree of the passage port 36 gradually increases as the second opening/closing plate 32 rotates toward the second open position. That is, the opening degree of the bypass flow path 15 gradually increases. When the second opening/closing plate 32 reaches the second open position, the opening 29 faces the entire passage port 36 in the axial direction, and the second opening/closing plate 32 fully opens the passage port 36. That is, the bypass flow path 15 is fully opened.

According to the above-described configuration, even when the first opening/closing plate 31 slightly opens the communication flow path 18 (refer to FIG. 7B), the second opening/closing plate 32 can maintain the closed state (refer to FIG. 8B). In addition, the second opening/closing plate 32 can also fully open the bypass flow path 15 (refer to FIG. 8D) at a timing when the first opening/closing plate 31 fully opens the communication flow path 18 (refer to FIG. 7D).

<Extending Direction of Valve Rod 35>

Returning to FIG. 3, in some embodiments of the present disclosure, as viewed in the turbine axial direction, the axis S of the valve rod 35 passes through an inner region R2 of a second virtual circle 92. Here, the second virtual circle 92 is a virtual circle having a diameter centered on the central axis C and equal to or smaller than the outer diameter (diameter) of the turbine wheel 9. The diameter of the second virtual circle 92 may be, for example, 10% or more and 75% or less, may be 10% or more and 50% or less, or may be 10% or more and 25% or less, with respect to the outer diameter of the turbine wheel 9.

The axis S of the present example passes through the central axis C as viewed in the turbine axial direction. In a case where such a configuration is adopted, the two communication ports 11A (refer to FIG. 2) connected to both end portions of the communication flow path 18 are disposed at different positions in the turbine radial direction.

According to the above-described configuration, the outlet 41 guides the exhaust gas toward the central axis C of the turbine wheel 9 as viewed in the turbine axial direction. Therefore, the length of the flow path of the bypass flow path 15 for guiding the exhaust gas to the discharge flow path 19 can be shortened. Thus, the configuration of the turbine housing 10 can be simplified.

<Drive Unit of Valve Device 30>

Returning to FIG. 1, the valve device 30 further includes an actuator 37 for driving the valve rod 35 and a connecting rod 38 (refer to FIG. 3) that connects the actuator 37 and the first end portion 351 of the valve rod 35. The actuator 37 is fixed to the compressor housing 7. The connecting rod 38 extends in the turbine axial direction and is configured to transmit the driving force of the actuator 37 to the valve rod 35. The valve rod 35 rotates with the driving of the actuator 37, so that the valve device 30 can open/close each of the communication flow path 18 and the bypass flow path 15.

According to the above-described configuration, since the actuator 37 is disposed in the compressor housing 7 instead of in the turbine housing 10 which is likely to have a relatively high temperature, a temperature rise of the actuator 37 and the connecting rod 38 can be avoided. Accordingly, since the thermal deformation of the valve rod 35 can be avoided, the shifting of the axis S of the valve rod 35 from a desired position can be avoided.

SUMMARY

For example, the contents described in some embodiments described above are understood as follows.

1) A double scroll turbine (5) according to at least one embodiment of the present disclosure is a double scroll turbine including: a turbine housing (10) formed with two double scroll-type scroll flow paths (11) configured to guide exhaust gas to a turbine wheel (9) and a discharge flow path (19) for discharging the exhaust gas that has passed through the turbine wheel, in which the turbine housing includes a communication flow path wall (28) that defines a communication flow path (18) that allows the two scroll flow paths to communicate with each other, and a bypass flow path wall (25) that defines a bypass flow path (15) for guiding the exhaust gas flowing through the communication flow path to the discharge flow path while bypassing the turbine wheel, the communication flow path wall is formed with an outlet (41) that guides the exhaust gas flowing through the communication flow path to the bypass flow path, the double scroll turbine further includes a valve device (30), and the valve device includes a valve rod (35) that extends to cross the communication flow path and that has an axis(S) provided to pass through the outlet, a first opening/closing plate (31) that is attached to the valve rod to extend along the axis and that is for opening/closing the communication flow path with rotation of the valve rod, and a second opening/closing plate (32) that extends in a direction intersecting the axis, is attached to the valve rod on a side closer to the outlet than the first opening/closing plate, and is for opening/closing the bypass flow path with the rotation of the valve rod.

According to the configuration of the above 1), the first opening/closing plate and the second opening/closing plate for opening/closing the communication flow path and the bypass flow path are configured to be separate from each other. Therefore, the double scroll turbine in which the degree of freedom in opening/closing the communication flow path and the bypass flow path is improved is realized. In such a double scroll turbine, whether or not to open/close the bypass flow path at the timing when the communication flow path is opened can be freely adjusted at the design stage of the double scroll turbine. Furthermore, it is also possible to shift the opening timing of the bypass flow path from the opening timing of the communication flow path, and it is also possible to suppress unintended leakage of the exhaust gas in the bypass flow path or the communication flow path.

2) In some embodiments, in the double scroll turbine described in the above 1), the second opening/closing plate defines an opening (29) that is located in an inner region (R1) of a first virtual circle (91) centered on the axis and having a maximum distance from the axis to an outer peripheral surface (27) of the second opening/closing plate as a radius, and the second opening/closing plate is configured to switch, with the rotation of the valve rod, between an open state in which the communication flow path and the bypass flow path are allowed to communicate with each other via the opening and a closed state in which the bypass flow path is closed.

According to the configuration of the above 2), the position of the opening defined by the second opening/closing plate changes with the rotation of the valve rod, so that the second opening/closing plate can open/close the bypass flow path. Whether or not the timing when the communication flow path is opened/closed and the timing when the bypass flow path is opened/closed are made to coincide with each other or differ from each other can be freely adjusted according to the shape of the second opening/closing plate that is determined at the design stage of the double scroll turbine. Accordingly, the communication flow path and the bypass flow path can be opened/closed more freely.

3) In some embodiments, the double scroll turbine described in the above 2) further includes a facing plate (33) that faces the second opening/closing plate from an upstream side in a flow direction of the bypass flow path, the facing plate defining a passage port (36) for passing the exhaust gas therethrough, in which the second opening/closing plate is configured to open the bypass flow path by allowing the opening to face the passage port, and to close the bypass flow path by shifting the opening from the passage port.

According to the configuration of the above 3), the facing plate separate from the turbine housing is provided, so that it is possible to avoid complicating the shape of the turbine housing. In addition, since the bypass flow path can be opened/closed simply depending on whether the opening defined by the second opening/closing plate faces the passage port, the configuration of the valve device can be simplified.

4) In some embodiments, in the double scroll turbine described in the above 3), a plurality of the passage ports are disposed at intervals in a circumferential direction with reference to the axis.

According to the configuration of the above 4), since the plurality of passage ports are disposed, the locations through which the exhaust gas passes can be distributed in the facing plate, and an excessive temperature rise in a specific part of the facing plate can be suppressed.

5) In some embodiments, in the double scroll turbine described in the above 4), the plurality of passage ports are disposed at equal intervals in the circumferential direction, and the openings defined by the second opening/closing plate are disposed at equal intervals in the circumferential direction by the same number as the plurality of passage ports.

According to the configuration of the above 5), the amount of rotation of the second opening/closing plate required for opening/closing the bypass flow path can be reduced as compared to a case where the number of openings is smaller than the number of passage ports. Accordingly, the bypass flow path can be quickly opened/closed.

6) In some embodiments, in the double scroll turbine described in any one of the above 1) to 5), as viewed along an axial direction (turbine axial direction) of the turbine wheel, the axis of the valve rod passes through an inner region (R2) of a second virtual circle (92) where a diameter centered on a central axis (C) of the turbine wheel is equal to or less than an outer diameter of the turbine wheel.

According to the configuration of the above 6), the outlet guides the exhaust gas toward the central axis of the turbine wheel as viewed in the axial direction. Therefore, the length of the flow path of the bypass flow path can be shortened. Therefore, the configuration of the turbine housing can be simplified.

7) A turbocharger (1) according to at least one embodiment of the present disclosure includes: a rotating shaft (3); the double scroll turbine (5) according to any one of the above 1) to 5), including the turbine wheel (9) connected to one end portion (3A) of the rotating shaft; and a compressor (8) including a compressor wheel (6) connected to the other end portion (3B) of the rotating shaft.

According to the configuration of the above 7), the same technical advantages as those of the above 1) can be obtained.

8) In some embodiments, in the double scroll turbine described in the above 7), the compressor further includes a compressor housing (7) that accommodates the compressor wheel, the valve device further includes an actuator (37) for driving the valve rod, and a connecting rod (38) that is connected to the actuator and the valve rod and that is configured to transmit a driving force of the actuator to the valve rod, and the actuator is disposed in the compressor housing.

According to the configuration of the above 8), since the actuator is disposed in the compressor housing instead of in the turbine housing which is likely to have a relatively high temperature, it is possible to avoid a temperature rise of the actuator and the connecting rod. Accordingly, since the thermal deformation of the valve rod can be avoided, the shifting of the axis of the valve rod from a desired position can be avoided.

REFERENCE SIGNS LIST

1: turbocharger
3: rotating shaft
3A: one end portion
3B: other end portion
5: double scroll turbine (turbine)
6: compressor wheel
7: compressor housing
8: compressor
9: turbine wheel
10: turbine housing
11: scroll flow path
15: bypass flow path
18: communication flow path
18A: communication flow path center line
19: discharge flow path
25: bypass flow path wall
27: outer peripheral surface
28: communication flow path wall
29: opening
30: valve device
31: first opening/closing plate
32: second opening/closing plate
33: facing plate
34: connection portion
35: valve rod
36: passage port
37: actuator
38: connecting rod
39: main body portion
41: outlet
91: first virtual circle
92: second virtual circle
339: outer peripheral surface
351: first end portion
352: second end portion
353: extending portion
C: central axis
L1: dimension
R1, R2: inner region

The invention claimed is:

1. A double scroll turbine comprising:

a turbine housing formed with two double scroll-type scroll flow paths configured to guide exhaust gas to a turbine wheel and a discharge flow path for discharging the exhaust gas that has passed through the turbine wheel, wherein the turbine housing includes a communication flow path wall that defines a communication flow path that allows the two scroll flow paths to communicate with each other, and a bypass flow path wall that defines a bypass flow path for guiding the exhaust gas flowing through the communication flow path to the discharge flow path while bypassing the turbine wheel, the communication flow path wall is formed with an outlet that guides the exhaust gas flowing through the communication flow path to the bypass flow path, the double scroll turbine further comprises a valve device, and the valve device includes a valve rod that extends to cross the communication flow path and that has an axis provided to pass through the outlet, a first opening/closing plate that is attached to the valve rod to extend along the axis and that is for opening/closing the communication flow path with rotation of the valve rod, and a second opening/closing plate that extends in a direction intersecting the axis, is attached to the valve rod on a side closer to the outlet than the first opening/closing plate, and is for opening/closing the bypass flow path with the rotation of the valve rod.

2. The double scroll turbine according to claim 1, wherein the second opening/closing plate defines an opening that is located in an inner region of a first virtual circle centered on the axis and having a maximum distance from the axis to an outer peripheral surface of the second opening/closing plate as a radius, and the second opening/closing plate is configured to switch, with the rotation of the valve rod, between an open state in which the communication flow path and the bypass flow path are allowed to communicate with each other via the opening and a closed state in which the bypass flow path is closed.

3. The double scroll turbine according to claim 2, further comprising:

a facing plate that faces the second opening/closing plate from an upstream side in a flow direction of the bypass flow path, the facing plate defining a passage port for passing the exhaust gas therethrough, wherein the second opening/closing plate is configured to open the bypass flow path by allowing the opening to face the passage port, and to close the bypass flow path by shifting the opening from the passage port.

4. The double scroll turbine according to claim 3, wherein a plurality of the passage ports are disposed at intervals in a circumferential direction with reference to the axis.

5. The double scroll turbine according to claim 4, wherein the plurality of passage ports are disposed at equal intervals in the circumferential direction, and the openings defined by the second opening/closing plate are disposed at equal intervals in the circumferential direction by the same number as the plurality of passage ports.

6. The double scroll turbine according to claim 1, wherein, as viewed along an axial direction of the turbine wheel, the axis of the valve rod passes through an inner region of a second virtual circle where a diameter centered on a central axis of the turbine wheel is equal to or less than an outer diameter of the turbine wheel.

7. A turbocharger comprising:

a rotating shaft;

the double scroll turbine according to claim 1, including the turbine wheel connected to one end portion of the rotating shaft; and a compressor including a compressor wheel connected to the other end portion of the rotating shaft.

8. The turbocharger according to claim 7, wherein the compressor further includes a compressor housing that accommodates the compressor wheel, the valve device further includes an actuator for driving the valve rod, and a connecting rod that is connected to the actuator and the valve rod and that is configured to transmit a driving force of the actuator to the valve rod, and the actuator is disposed in the compressor housing.

* * * * *